United States Patent [19]

Paxton et al.

[11] Patent Number: 4,628,752
[45] Date of Patent: Dec. 16, 1986

[54] ACTUATORS AND ACTUATOR ASSEMBLIES

[75] Inventors: William G. Paxton, Alstone; Derek Wilkinson, Bishops Cleeve, both of England

[73] Assignee: Smiths Industries Public Limited Company, London, England

[21] Appl. No.: 711,938

[22] Filed: Mar. 15, 1985

[30] Foreign Application Priority Data

Mar. 22, 1984 [GB] United Kingdom ................. 8407494

[51] Int. Cl.⁴ ............................................. F16H 57/10
[52] U.S. Cl. ..................................... 74/411.5; 92/17; 92/23; 92/131; 188/31; 310/77
[58] Field of Search ................... 92/7, 17, 18, 19, 131, 92/23; 244/224; 310/77; 188/31; 74/89.15, 411.5

[56] References Cited

U.S. PATENT DOCUMENTS

| | | | |
|---|---|---|---|
| 2,835,459 | 5/1958 | Stewart | 244/224 |
| 3,050,943 | 8/1962 | Thorel | 92/18 |
| 3,177,982 | 4/1965 | Geyer | 92/17 |
| 3,777,620 | 12/1973 | Schultheiss | 92/131 |
| 3,886,255 | 5/1975 | Noly | 310/77 |
| 4,033,233 | 7/1977 | Toi | 92/131 |
| 4,173,322 | 11/1979 | Macdonald | 244/224 |
| 4,509,408 | 4/1985 | Kuroda | 92/17 |
| 4,526,058 | 7/1985 | Runkel | 244/224 |
| 4,557,746 | 12/1985 | Braithwaite | 92/17 |

*Primary Examiner*—Abraham Hershkovitz
*Attorney, Agent, or Firm*—Pollock, Vande Sande and Priddy

[57] ABSTRACT

An actuator assembly has two actuators mounted back-to-back such that their actuator rods are displaced in opposite directions. Each actuator has a spring embracing the rod between two slidable collars. The spring urges the collars apart towards stops on the rod and stops on the actuator housing, so that, on failure of the actuator, the rod is displaced to a central position. The rod is driven by a motor which also rotates two discs of different diameters. Each disc has a notch in its edge which align only at the central position of the rod and allow a roller to drop into the notch. When the actuator fails, a solenoid releases a locking arm which engages the rollers, keeping them in the notches thereby preventing rotation of the discs and displacement of the rod.

10 Claims, 4 Drawing Figures

ACTUATORS AND ACTUATOR ASSEMBLIES

BACKGROUND OF THE INVENTION

This invention relates to actuators and actuator assemblies.

The invention is more particularly, but not exclusively, concerned with linear actuators.

Linear actuators have a rod that is movable into and out of a housing, under control of an electrical or other input signal, so as to effect linear displacement of a member coupled to the end of the rod. In some applications, such as in aircraft, where a high degree of reliability and safety is required, two actuators are commonly coupled together to form an assembly which is capable of effecting a similar displacement even when one of the actuators fails or malfunctions. The two actuators may be joined together back-to-back at their housings so that the respective rods are displaced in opposite directions by the input signals. In this way, each actuator contributes half of the total displacement effected by the assembly.

In order to ensure that the assembly is still capable of functioning satisfactorily if one of the actuators fails, it is necessary that the rod of the failed actuator locks in position relative to its housing. If this did not happen, any displacement caused by the correctly functioning actuator might merely be accommodated by displacement of the rod in the housing of the failed actuator. Present actuators are therefore constructed so that the rod locks in position immediately on failure, that is, in the position at which the actuator fails.

Although such actuators do enable the assembly to provide some degree of control if one actuator has failed, they suffer from a significant disadvantage. If one actuator in an assembly fails when the assembly is providing maximum displacement, such as, with both rods fully out of their housings, one rod will be locked in this position, so that, even if the other rod is fully retracted within its housing it will only just return the member coupled to the actuator to a central position. Since the most critical control is generally required about the central position of the member, it will be appreciated that the actuator assembly, in this failed state, will not provide the desired degree of control.

BRIEF SUMMARY OF THE INVENTION

It is an object of the present invention to provide an actuator, and an actuator assembly by which this disadvantage can be overcome.

According to one aspect of the present invention, there is provided actuator means comprising an actuator member that is displaceable relative to a housing between a first position and a second position, means for returning the said actuator member on failure of said actuator means to a third, predetermined position intermediate said first and second positions, and means for locking said actuator member in said third, predetermined position on failure of said actuator means.

The third, predetermined position may be substantially equidistant between the first and second positions. The means for returning the actuator member is preferably a spring, and the actuator member is preferably a rod that is displaceable along its length. The actuator means may include two collar members slidable along the rod, two stop members fixed with the rod at spaced locations, and two stop members on the housing, displacement of the collars being limited by engagement of the collars with the stop members, and the spring being arranged to engage both collars and urge each of them into contact with both a stop member on the housing and a stop member on the rod.

The means for locking the actuator member may include a rotatable member coupled with the actuator member. Preferably a plurality of rotatable members are coupled with the actuator member which are arranged to be rotated at different rates on displacement of the actuator member. The or each rotatable member may be a circular disc having a notch in its edge, the means for locking the actuator member including a roller that is urged against the or each disc, and the or each notch being aligned with the roller only when the actuator member is in the third, predetermined position. The roller may be mounted on a first arm, and a second arm be operable to engage the roller arm and retain it in engagement with the notch in the or each rotatable member such as to prevent rotation of the or each rotatable member and thereby lock the actuator in the third, predetermined position. The means for locking the actuator member may include a solenoid that is arranged to hold the locking arm out of engagement with the roller arm except on failure of the actuator means.

The actuator means preferably includes an electric motor that is coupled to rotate a screw mechanism that drives the actuator rod along its length. A brake plate may be located adjacent the rotatable member such that an axial force on the rod urges the rotatable member into contact with the brake plate to resist rotation of the rotatable member. The actuator means may include a slip clutch between the motor and the actuator member, and the screw mechanism may include a non-jamming stop at either end to prevent jamming of the screw at its limit of travel. The actuator means may include a displacement transducer coupled with the actuator member.

According to another aspect of the present invention there is provided an actuator assembly including two actuator means according to the said one aspect of the present invention, the two actuator means being coupled together such that displacement of the actuator member of one actuator means is additive to the displacement of the actuator member of the other actuator means.

A linear actuator and an assembly including two such actuators in accordance with the present invention, will now be described, by way of example, with reference to the accompanying drawings.

DETAILED DESCRIPTION

Figure 1:
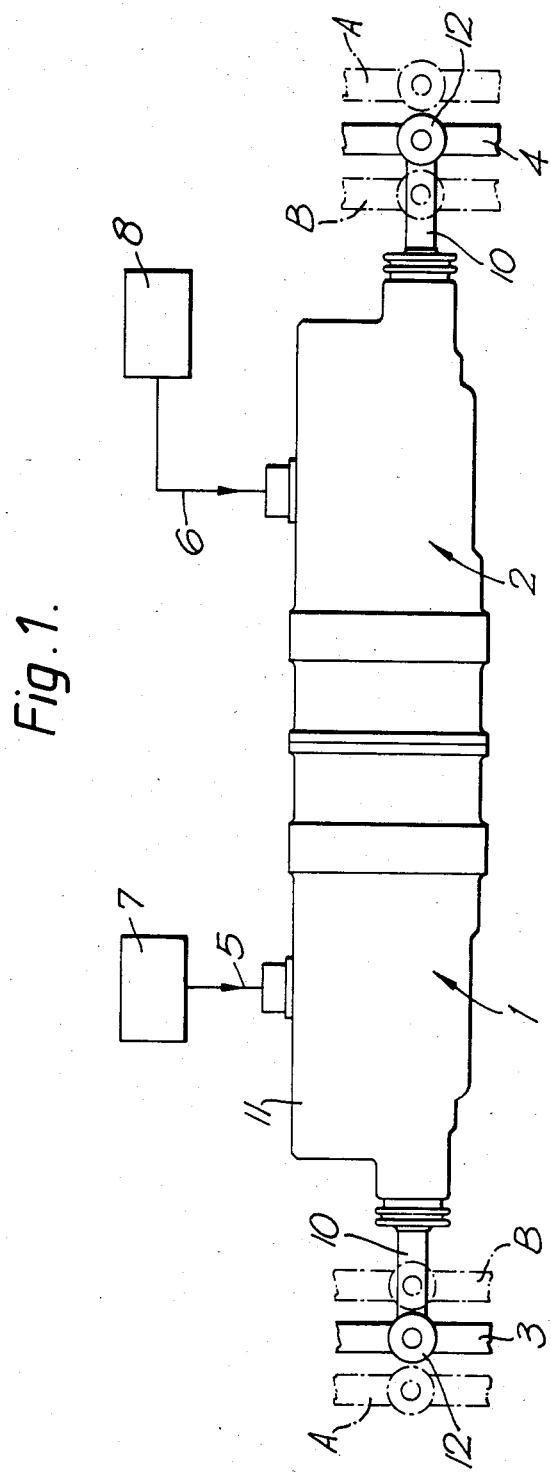
FIG. 1 shows the assembly schematically.

With reference to FIG. 1, the actuator assembly includes two actuators 1 and 2 joined back-to-back in axially alignment with one another. Each actuator has a rod 10 that projects from a housing 11 and that has a rod-end bearing 12 which is coupled to a respective arm member 3 and 4. The assembly is controlled by input signals supplied along cables 5 and 6 from control units 7 and 8, and is operable to displace the rods 10, in opposite directions, between first, outermost positions A and second, innermost positions B (both shown by broken lines), so as to produce an additive overall displacement.

The actuator assembly may be connected between a pilot's control lever and a control surface or hydraulic valve. The actuator assembly, in such an application, is used to apply correction or compensation to the movement of the control lever made by the pilot.

Figure 2:
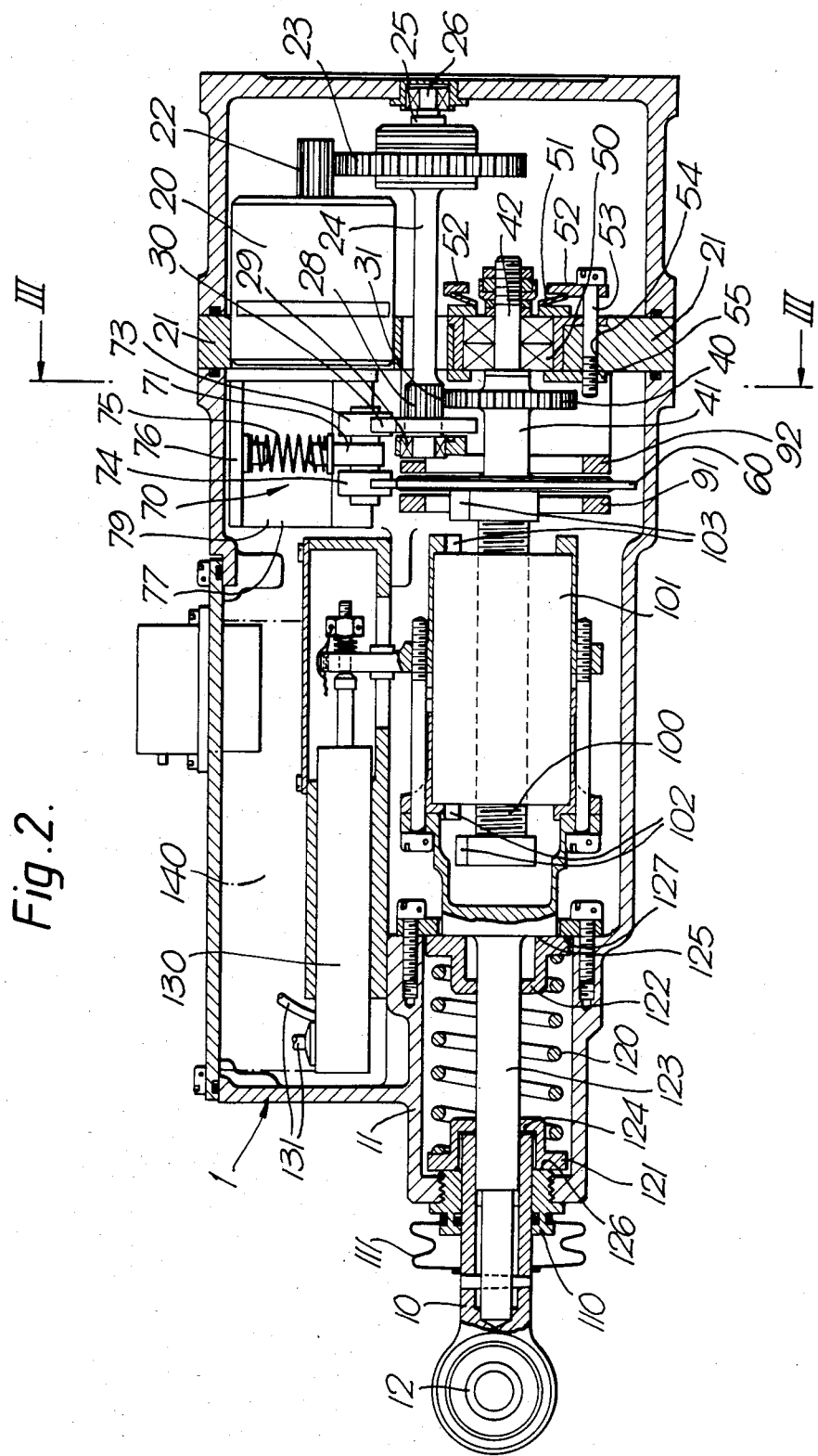
FIG. 2 is a cross-section elevation of one of the actuators.

With reference now also to FIGS. 2 and 3, which show the actuator 1 in greater detail, the housing 11 contains a non-cogging brushless dc motor 20 mounted towards the rear of the actuator on a thrust plate 21 which extends laterally across the housing. The motor 20 has a toothed pinion 22 which engages a reduction gear 23 mounted on a shaft 24. The reduction gear 23 includes a slip clutch the operation of which will be described in more detail below. At its rear end 25, the shaft 24 is journalled in a bearing 26 on the rear end plate 27 of the housing. The forward end 28 of the shaft 24 is also supported by a bearing 29 and carries a small circular lock cam disc 30. The shaft 24 is also provided with a short pinion 31 which engages the edge of a drive gear wheel 40.

The drive gear wheel 40 is mounted on a drive shaft 41 which extends parallel to the reduction gear shaft 24. At its rear end 42, the drive shaft 41 is supported by thrust bearings 50 mounted in the housing thrust plate 21. The rear end of the thrust bearings 50 bears against the inside edge of a frusto-conical brake deflection spring 51. The rear, outer edge of the spring 51 bears against a ring member 52 which is supported relative to the thrust plate 21 by three bolts 53. The bolts 53 extend through a smooth aperture 54 through the thrust plate 21 and are free to move in and out of the aperture to a limited extent. The forward end of the bolts 53 project from the forward face of the thrust plate 21 where they are screwed into the second ring member 55 which extends around the thrust bearings 50, overlapping them around their forward edge.

Figure 3A:
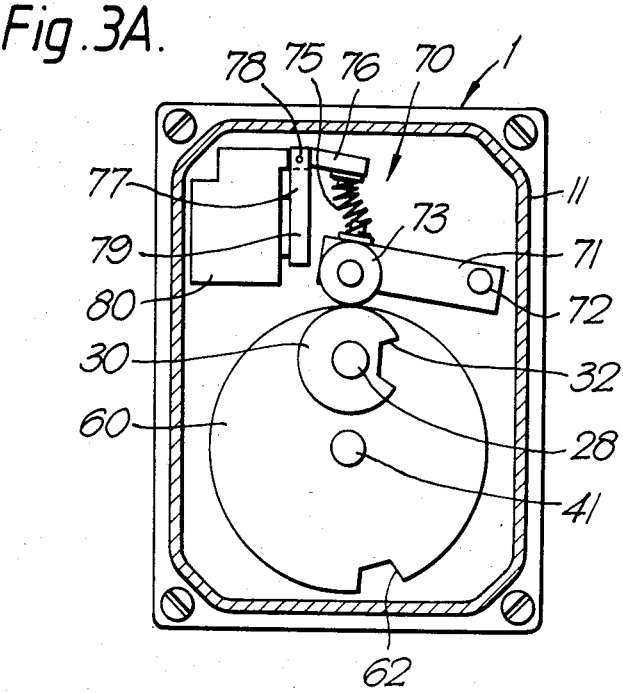
FIGS. 3A and 3B are transverse sectional views on the line III—III of FIG. 2 showing the actuator in two different positions.
Figure 3B:
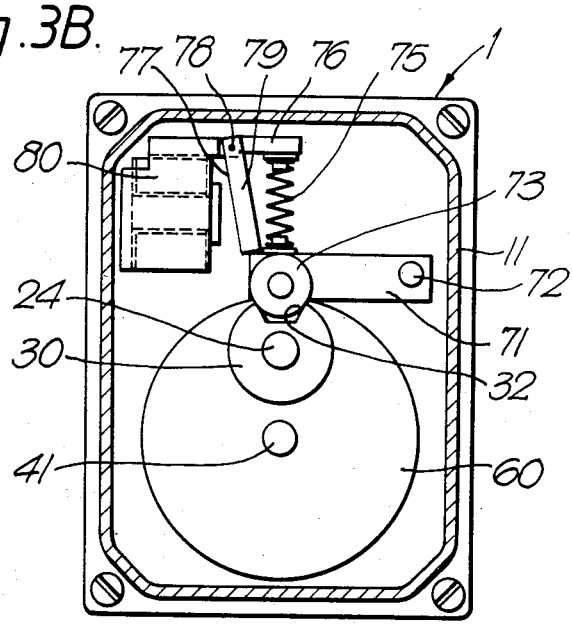

Forwardly of the drive gear wheel 40, the drive shaft 41 carries a large circular lock cam disc 60 arranged coaxial with the drive shaft. The diameter and location of the large disc 60 is such that its upper edge is aligned with the upper edge of the small disc 30. Each disc 30 and 60 has a locking notch 32 and 62 respectively formed in its edge, as best shown in FIGS. 3A and 3B. The gearing of the two discs 30 and 60 is such that the small disc 30 rotates four and half revolutions for every one revolution of the large disc 60.

A locking mechanism 70 is mounted in the housing 11 above the two lock cam discs 30 and 60. The locking mechanism includes a lateral arm 71, tangential to the discs 30 and 60, that is pivoted at one end 72 and that supports two lock rollers 73 and 74 at its other end. The arm 71 is urged downwardly against the discs by a preloaded helical spring 75 the lower end of which bears on the arm 71 above the rollers. The upper end of the spring 75 bears against a horizontal arm 76 of an L-shape armature 77 that is pivoted about its elbow 78. The action of the spring 75 thereby urges the armature in an anti-clockwise sense, as viewed in FIGS. 3A and 3B. The other, locking arm 79 of the armature extends downwardly and is normally held in a vertical position, as shown in FIG. 3A, by the action of a solenoid 80. When the solenoid 80 is not energized, the spring 75 causes the lower end of the locking arm 79 to be urged against the end of the lateral arm 71. The notches 32 and 62 in the discs 30 and 60 are V-shape, with flat bases.

The notch 62 is slightly larger than the other notch 32, the size of which is such that the roller 73 only contacts the notch 32 at two points on its inclined sides. In this way positive, accurate location is ensured.

The large disc 60 extends intermediate forward and rear brake plates 91 and 92 respectively, of annular shape. In normal operation, the large disc 60 is spaced from the faces of both brake plates 91 and 92.

The forward end of the drive shaft 41 has a threaded portion 100 which is coupled with the actuator rod 10 by means of a high efficiency screw mechanism 101. The screw mechanism 101 is joined to the rear of the rod 10, so that rotation of the drive shaft 41 causes linear displacement of the screw mechanism and hence of the rod. The threaded portion 100 and the screw mechanism 101 have non-jamming stops 102 and 103 at opposite ends which prevent jamming at the extremes of travel of the rod 10.

The actuator rod 10 extends out of the forward end of the housing 11 through a linear bearing and seal 110 and through a flexible bellows unit 111 the ends of which are joined to the rod and the housing respectively. A helical spring 120 encompasses the rod 10 within the housing 11, the ends of the spring bearing on respective forward and rear collars 121 and 122. The collars 121 and 122 are free to slide along a rear section 123 of the rod, the extent of displacement of the collars along the rod being limited by engagement with stops provided by respective shoulders 124 and 125 on the rod, and the extent of displacement relative to the housing being limited by engagement with respective stops 126 and 127 secured to the housing. The spring 120 thereby acts to urge the rod 10 to the position shown in FIG. 2, in which it is equidistant from its extreme positions A and B. The pre-load resilience of the spring 120 exceeds the normal driven load of the actuator. The rod 10 will therefore be displaced with the housing 11 when a normal working load is applied across the assembly. Under normal loads, the actuator assembly will act like a rigid link between arms 3 and 4, movement of one arm being communicated to a directly equivalent movement of the other arm, assuming that the motor 20 is not energized to cause any displacement of the rod relative to the housing 11.

Coupled to the rear of the rod 10 there are two linear displacement transducers 130 (only one of which is shown in the drawings) arranged side by side and providing nominally identical outputs representative of the position of the rod along its path of travel. The transducers 130 are linear variable differential inductance transducers, although various other transducers could alternatively be used. Output signals from the transducers 130 are supplied to the control units 7 and 8 (FIG. 1) via cables 131 and 5 and 6. An electronics module 140 within the actuator housing 11 controls supply of signals to the motor 20 and the solenoid 80 in accordance with the input command signals on cables 5 and 6.

In normal operation, signals from the control units 7 and 8 are supplied to the electronics module 140 which in turn energizes the motor 20 until the rod 10 has been displaced to the desired position, as indicated by the outputs of the transducers 130. Rotation of the motor pinion 22 rotates the shaft 24 via the reduction gear 23. This in turn rotates the small lock cam disc 30, the drive shaft 41, via the drive gear 40, and hence the large lock cam disc 60. The rollers 74 roll around the edge of the discs 30 and 60 as they rotate, being held out at either of the notches 32 or 62 of one disc by the edge of the other disc as shown in FIG. 3A. When both notches 32 and 62 are aligned with both rollers 30 and 60, as shown in FIGS. 2 and 3B, the rollers and the lateral arm 71 are free to drop downwards, into engagement with the notches. This will only happen on two rotations of the large disc 60, that is, nine rotations of the small disc 30. The orientations of the discs 30 and 60 are selected so that this alignment only occurs at the mid or central point of the travel of the rod 10, the next alignment positions being outside the extreme positions A and B of the rod 10. While the motor 20 is energized, the solenoid 80 is also energized, holding the locking arm 79 away from the end of the lateral arm 71. The rollers 73 and 74 are therefore free to roll out of engagement with the notches 32 and 62 on further rotation of the discs 30 and 60.

If either actuator 1 or 2 should fail (such as by a malfunction of the motor 20, the electronics module 140, or the control units 7 or 8) the motor 20 and solenoid 80 in the failed actuator will be de-energized and the spring 120 will drive the rod 10 to the third, central position shown in FIG. 2. When the rod 10 reaches the central position, the lock cam discs 30 and 60 will be aligned, as shown in FIG. 3B, so that the rollers 73 and 74 engage the notches 32 and 62 respectively. The action of the spring 75 rotates the armature 77 so that the locking arm 79 swings across the end of the lateral arm 71 (as shown in FIG. 3B), to keep the rollers 73 and 74 in engagement with the notches. In this way further rotation of the discs 30 and 60 is prevented and the rod 10 is locked in position.

Because of the gearing between the drive shaft 41 and the screw mechanism 101, and between the drive shaft and the gear shaft 24, any rapid movement of the rod 10, on failure, will produce a correspondingly more rapid rotation of the reduction gear shaft 24. The slip clutch in the reduction gear 23 acts to limit inertia forces which would be imposed on the gearing and lock mechanism 70 by a rapid deceleration of the motor 20.

During normal drive, if the rod 10 is in its innermost position B, the rear stops 103 will contact at the rear end of the screw mechanism 101 and prevent further displacement of the screw mechanism relative to the threaded portion 100 of the drive shaft 24. The slip clutch again acts to limit the inertia forces which would be imposed on the gearing and screw mechanism by rapid deceleration of the motor 20.

If during normal drive by the motor 20, with the rod 10 at any intermediate position between A and B, an external axial overload force is applied to the rod, this will be resisted partly by torque reaction from the motor, through the gearing. The axial overload force will cause a small displacement of the shaft 41 along its length, against the action of the brake deflection spring 51, until the large disc 60 contacts the face of the brake plate 91 or 92, according to the direction of the external force. The reaction between the large disc 60 and the brake plate 91 or 92 gives rise to braking friction torque which prevents the large disc rotating and hence prevents movement of the rod 10. When subject to an external overload force the actuator 1 or 2 will therefore behave as a solid link; the overload force will not drive the gearing or motor.

By ensuring that the actuator rod 10 is locked in a central position, on failure of one actuator, the second actuator in the assembly is still capable of effecting control on both sides of the central position, where control is most critical. It will be appreciated that, in different actuators, the most critical control point might be located at a different point between the extreme positions of the actuator rod, such as, at a location two-thirds along its path of travel. In such cases, the locked position would be at a similar location.

For some applications it would be possible to lock the rod in position by directly engaging the rod itself. However, there are advantages in locking the rod by engaging a rotatable member that is geared to displacement of the rod, since this enables a relatively small and lightweight locking mechanism to lock the rod against reaction by large external axial forces.

The actuator need not be linear but could instead have a rotary actuator member that is similarly driven to an intermediate position, on failure, and is then locked against further displacement.

What we claim is:

1. Actuator means comprising a housing, a linear actuator member, means for displacing the actuator member along its length relative to the housing between a first position and a second position, means for returning the said actuator member on failure of said actuator means to a third, predetermined position intermediate said first and second positions, and locking means for automatically locking said actuator member in said third predetermined position on failure of said actuator means, said locking means comprising a first rotatable locking member, means coupling said first rotatable locking member with said actuator member so that the locking member is rotated on linear displacement of the actuator member, a second locking member, and means mounting the second locking member to align with the first locking member and to engage therewith in locking engagement to prevent rotation of said first locking member and displacement of said actuator member in both directions only when said actuator member is in said third predetermined position.

2. Actuator means according to claim 1, wherein said third, predetermined position is substantially equidistant between said first and second positions.

3. Actuator means according to claim 1, wherein the said means for returning said actuator member includes a spring.

4. Actuator means according to claim 1, wherein the said actuator member is a rod that is displaceable along its length.

5. Actuator means according to claim 4, wherein the actuator means includes two collar members slidable along the said rod, two stop members fixed with the rod at spaced locations, two stop members on the housing, displacement of said collars being limited by engagement of said collars with said stop members, and a spring that engages both said collars and urges each of them into contact with both a stop member on the housing and a stop member on the rod.

6. Actuator means according to claim 1, wherein the said rotatable locking member is a circular disc, said disc having a notch in its edge, the second locking member including a roller and means for urging the roller against the edge of the disc, and said notch being aligned with the roller only when the actuator member is in the said third, predetermined position.

7. Actuator means according to claim 6, wherein the said first rotatable locking member includes a plurality of discs, each said disc having a notch in its edge, and means coupling each said disc with said actuator member to be rotated at different rates on displacement of said actuator means with the notches aligned with each other and with the roller only when the actuator member is in the said third, predetermined position.

8. Actuator means according to claim 7, including a locking arm and a solenoid, said locking arm being mounted for displacement to a locking position in which it retains said roller in engagement with said notches, and said solenoid retaining the locking arm out of the locking position until de-energized on failure of the actuator means.

9. Actuator means according to claim 6, including a brake plate, means mounting the brake plate adjacent a face of the disc such that axial displacement of the disc urges it into contact with the brake plate so as thereby to resist rotation of the disc.

10. An actuator assembly comprising two actuator means, each actuator means comprising a housing, an actuator rod, and means for displacing the actuator rod along its length relative to its said housing between a first position and a second position, the two actuator means being coupled together in a back-to-back relationship so that their respective actuator rods are displaced in opposite directions, each said actuator means including a spring that returns the actuator rod in said actuator means to a third predetermined position intermediate the first and second positions, and a locking mechanism in each said actuator means that locks the actuator rod in the said third predetermined position automatically on failure of the respective said actuator means, each said locking mechanism comprising a first rotatable locking member, means coupling said first rotatable locking member with the actuator rod in said actuator means so that said first locking member is rotated on linear displacement of the said actuator rod, a second locking member, and means mounting the second locking member to align with the first locking member and to engage therewith in locking engagement preventing rotation of the first locking member and displacement of the actuator rod in both directions only when the actuator rod in said actuator means is in said third predetermined position.

* * * * *